Robbins & Powell,

Faucet.

No. 905. Reissued Feb. 21, 1860.

Witnesses.

Geo. H. Knight

G. Steever

Inventors.

Martin Robbins

James T. Powell

N. PETERS, PHOTO-LITHOGRAPHER, WASHINGTON, D. C.

UNITED STATES PATENT OFFICE.

JAMES POWELL, OF CINCINNATI, OHIO, ASSIGNEE OF MARTIN ROBBINS AND JAMES POWELL.

IMPROVEMENT IN FAUCETS.

Specification forming part of Letters Patent No. 22,402, dated December 21, 1858; Reissue No. 905, dated February 21, 1860.

*To all whom it may concern:*

Be it known that MARTIN ROBBINS and JAMES POWELL, both of Cincinnati, Hamilton county, Ohio, invented certain new and useful Improvements in Faucets; and I, the said JAMES POWELL, being sole proprietor of the said invention, do hereby declare the following to be a full and exact description of the same, reference being had to the accompanying drawings, making part of this specification.

The said invention relates to that class of cocks in which a valve and seat (and eccentric key-stem) take the place of the more customary taper chamber and perforated plug; and it consists in arrangements to insure the effective relative working of the valve-stem and key, to prevent leakage around the stem of the latter and compensate for the gradual wearing of the packing, and to avoid any abrasive action between the valve and its seat. It is of especial importance in such faucets to preserve the valve-stem from any lateral motion. For this purpose it has been customary to construct the valve-stem with a yoke having guide-pieces extending from each end or side, with corresponding openings or grooves in the chamber of the faucet. This is disadvantageous in many respects, chiefly from necessitating an undue enlargement of the valve-yoke and the cock chamber, and from its complicated nature rendering the faucet expensive and liable to get out of repair. It is also very necessary in the construction of the packing around the stem of such faucets to provide for its gradual wearing away and compensate for any deflection of the key from its true position by the strain that is exerted upon it by the valve-stem. It is usual to construct such key-stems with a collar or flange fitted to the cap with or without packing around it, but as it is perfectly rigid it soon wears away and allows the fluid to escape between the cap and stem.

The object of our invention is to so construct and operate the valve-yoke that it may be confined to a strictly rectilinear path without requiring any projection on its sides or ends; also to compensate for any deflection of the key-stem and to provide effectually for the gradual wearing away of the rubbing-surfaces of the packing and produce a reliable water-tight joint of simple construction.

Figure 3:
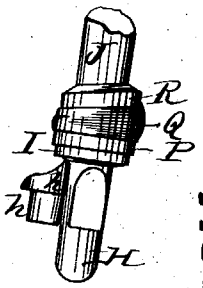
Figure 1:
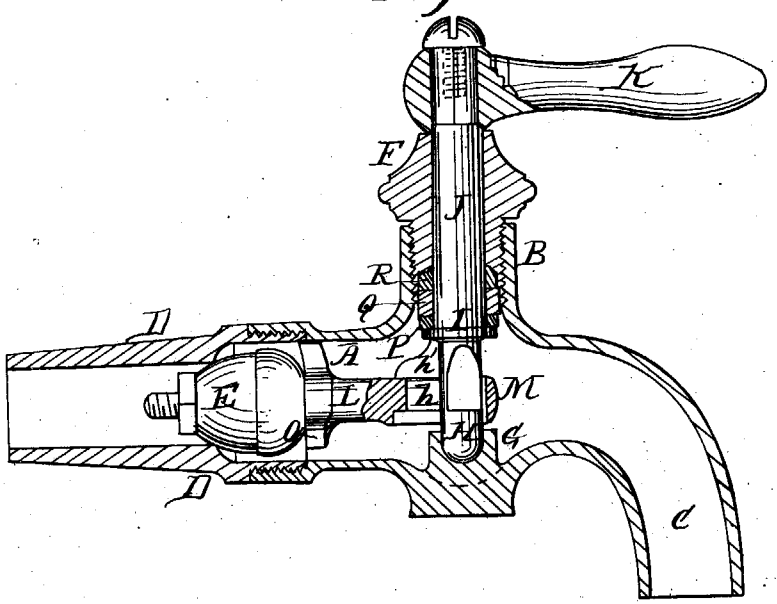
Figure 2:
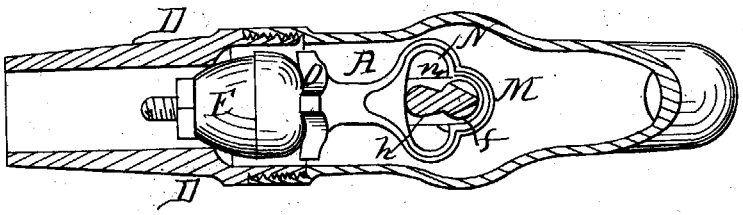

In the accompanying drawings, Figures 1 and 2 are respectively a vertical and a horizontal axial section, and Fig. 3 a diagram illustrating the action of the compensating cushion and collar.

A represents the barrel or chamber, B the neck, C the nozzle, D the valve-seat, E the valve, and F the cap.

J is the key-stem, and K the handle by which it is rotated. L is the valve-stem connected at its front end with a yoke, M, having on its upper side the represented cavity for the ready insertion of the key-stem, and on its under side a floor, N, which rests and slides upon a standard or guide, G, projecting upward from the floor of the chamber A. In the present illustration, the floor N is perforated with an oblong slot, *n*, to permit the traverse of the valve-stem and at the same time prevent its lateral deviation from a right line, and the key-stem terminates in a point, H, which passes through the said slot and turns in a countersink in the guide G. The key-stem J has on one side, at or near its lower end, a projection, *h*, which, as the key is turned, operates the valve through the medium of the yoke M, said yoke being provided with three bearings, *m m′ m″*, against which the projection *h* acts.

*h′* is a flange surmounting the projection *h*, and engaging above the valve-stem L, so as to assist in confining it to a horizonal path. The rectilinear motion of the valve is further insured by guide-pins O, which are especially useful in steadying the valve to its seat.

The flange *h′* may be dispensed with, if preferred, as the valve-stem L can be confined to a horizontal path through the medium of the under side of projection *h* and the upper side of floor N.

It is not necessary that the yoke M should entirely encircle the projection *h*, as the floor N is sufficient connection between the three bearing-points *m m′ m″*, against which the projection *h* acts. Nor is the invention confined to the precise shape or dimensions of the guide G. The guide G, being projected from the wall of the faucet, provides not only surface upon which the valve-stem slides and is guided, but economizes metal and affords ample space around it for the free passage of the water or other fluid, without undue enlargement of the chamber A.

Neither the pivot H, slot *n*, nor the countersink in the guide G is essential to the effectiveness of the faucet.

If deemed preferable, the neck B may be slightly contracted at its lower end, so as to embrace and confine the collar I and prevent the key-stem J from dropping too far into the chamber A.

The guide-pins O may be elongated, so as to occupy the whole length of the opening of chamber A, rendering them more durable and the valve-stem steadier in its motion.

The severe horizontal pressure of the valve-stem upon the key in this class of cocks tending to throw the key-stem J out of line, the ordinary collar or packing is found insufficient to insure a tight joint after it has been for a time in use. To remedy this defect, the collar I is placed low down, and over it a washer, P, and annular cushion Q, of india rubber or other suitable material, which supports a loose collar, R, so as to cause it to fit snugly up to the under side of the cap, although the key may be deflected.

Fig. 3 exhibits the action of the cushioned collar. The cushion also acts advantageously in compensating for the wear of the loose collar R by constantly exerting an expansive pressure against it. It will be evident that this arrangement is equally applicable to valves closing either in the direction of the current or against it, and that it may be applied to the various descriptions of faucets, such as stop-cocks, basin-cocks, and also to steam-cocks.

I am aware that valve-stems have been guided in a rectilinear path, but know of no previous instance in which this result is accomplished through the medium of a projection from the inside of the wall of the faucet upon and in connection with which the valve-stem is both supported and adapted to be guided in a right line.

The following is what I claim as new, and desire to secure by Letters Patent, as the invention of the said MARTIN ROBBINS and myself:

1. The application to the key-stem of the collar I, cushion Q, and loose collar R, or their equivalents, in the manner or for the purposes described.

2. The valve-stem L, formed with three bearing-surfaces, *m m′ m″*, when connected by a floor, N, and operated upon by a suitable cam, *h*, in the manner and for the purpose explained.

3. The elevated or projecting guide G, or its equivalent, when combined, substantially as and for the purpose set forth, with a valve-stem formed and adapted to be actuated by a cam or other eccentric on the key-stem in both opening and closing the valve.

In testimony of which, as the invention of MARTIN ROBBINS and myself, I hereunto set my hand.

JAMES POWELL.

Witnesses:
GEO. H. KNIGHT,
FRANCIS MILLWARD.